United States Patent [19]

Wally

[11] 3,708,014

[45] Jan. 2, 1973

[54] HYDROCHLORIC ACID/HYDROFLUORIC ACID TREATMENT TO REMOVE ASBESTOS FIBERS FROM A WELL BORE

[75] Inventor: Robert F. Wally, Bartlesville, Okla.

[73] Assignee: Phillips Petroleum Company

[22] Filed: June 23, 1971

[21] Appl. No.: 156,091

[52] U.S. Cl. .............. 166/307, 134/3, 166/312, 252/8.55 C
[51] Int. Cl. .... E21b 43/27, E21b 43/28, C03b 37/00
[58] Field of Search......166/307, 281, 271, 311, 312; 252/8.55 C; 23/91, 88, 110 P, 110 R; 162/3; 134/3, 41, 42

[56] References Cited

UNITED STATES PATENTS

| | | | |
|---|---|---|---|
| 112,650 | 3/1871 | Stevens | 23/110 p |
| 2,225,695 | 12/1940 | Henderson et al. | 252/8.55 C |
| 2,663,689 | 12/1953 | Kingston et al. | 252/8.55 C |
| 2,784,788 | 3/1957 | Hughes et al. | 252/8.55 C X |
| 2,926,997 | 3/1960 | Kalousek | 23/110 R |
| 3,184,288 | 5/1965 | Lisle | 23/110 R |
| 3,297,516 | 1/1967 | Naumann et al. | 23/110 R X |
| 3,458,393 | 7/1969 | Battista | 162/3 |
| 3,543,856 | 12/1970 | Knox et al. | 166/307 X |
| 3,650,886 | 3/1972 | Torok | 162/3 |
| 3,652,382 | 3/1972 | Gancy | 162/3 |

Primary Examiner—Stephen J. Novosad
Attorney—J. Arthur Young et al.

[57] ABSTRACT

An aqueous mixture of hydrochloric acid and hydrofluoric acid is employed to accomplish the 98 percent disintegration of chrysotile asbestos. In a specific embodiment an aqueous mixture of hydrochloric acid and hydrofluoric acid is injected into a well to remove chrysotile asbestos injected into the well in a well-working fluid.

4 Claims, No Drawings

HYDROCHLORIC ACID/HYDROFLUORIC ACID TREATMENT TO REMOVE ASBESTOS FIBERS FROM A WELL BORE

BACKGROUND OF THE INVENTION

This invention relates to dissolving asbestos in aqueous acid solutions. In one of its aspects, this invention relates to removing inorganic mineral well-working additives from well bore holes. In another of its aspects, this invention relates to removing well plugging materials from an oil well bore hole. In one of its concepts, this invention relates to removing inorganic mineral plugs from oil well bore holes. In another of its concepts, this invention relates to removing asbestos oil well additives from oil well bore holes.

Asbestos fibers have been used to control the viscosity and carrying capacity of drilling muds, to stop seepage loss in work-over muds, and longer fibers of chrysotile asbestos have been used as lost circulation material. In the latter two uses cited above the fibers are used to block flow into the pores of the well. The use of asbestos fiber as a lost circulation material has never had much acceptance because no method of removing it from the producing zone existed if the lost circulation occurred in zones of possible production. Asbestos fibers are almost completely inert. Contamination does not affect the fiber nor do microorganisms degrade it. Because of its inertness, asbestos fiber has been considered acid resistant. Because of this assumption some well operators have rejected the use of asbestos fiber in their work-over and completion fluids. It has been thought that the fibers would plug the pores of the producing formation and could not be removed. Prior literature, while not finding asbestos inert, would certainly lead one to believe that asbestos fiber could be damaging to the production of a well. S. Speil and J. P. Leineweber in "Asbestos Minerals in Modern Technology", Johns Manville Research and Engineering Center, Environmental Research, Volume II, No. 3, April, 1969, show that chrysotile asbestos is between 50 and 60 percent soluble in boiling HCl of either four normal or 25 percent normal. They also show that regardless of the type of mineral acid used there is very little difference in the solubility of chrysotile asbestos. Therefore, even under the best conditions described by Speil and Leineweber almost 40 percent residue would be left after asbestos fiber had been treated with HCl. If plugging were a problem, a residue of approximately 40 percent would still leave considerable formation damage.

Surprisingly, I have found that an aqueous solution of a combination of acids can dissolve 98 percent of an agglomeration of chrysotile asbestos fibers.

It is therefore an object of this invention to provide a method for dissolving chrysotile asbestos fibers. It is another object of this invention to provide a method for removing chrysotile asbestos fibers from oil wells to which they have been added in the production of the well.

Other concepts, objects and the several advantages of this invention are apparent from a study of this disclosure and the appended claims.

In accordance with the invention a method for disintegrating solid chrysotile asbestos is provided which comprises mixing, at a temperature and for a time sufficient to react the chrysotile asbestos, the chrysotile asbestos and a mixture of hydrochloric acid and hydrofluoric acid in proportions to supply at least a stoichiometrically ideal reactive amount of hydrochloric acid and hydrofluoric acid per unit of chrysotile asbestos to be reacted.

In one embodiment of the invention chrysotile asbestos injected into a well bore in a well-working operation is removed from the well bore by injecting into the well an aqueous solution containing a combination of hydrochloric acid and hydrofluoric acid and circulating this solution for a time sufficient to dissolve the chrysotile asbestos.

The chrysotile asbestos that is disintegrated by the method of this invention has a general formula 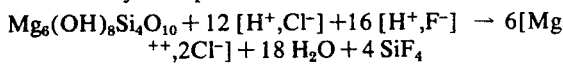 $Mg_3Si_2O_5(OH)_4$ and physically is described as cylindrical filuils. These fibers have been described as consisting of layers of silicon-oxygen tetrahedra condensed on to magnesium hydroxide layers with each silicon-oxygen/magnesium hydroxide layer superimposed on layers of similar composition. There is some mechanical interlocking between the layers but no chemical bonding.

Stoichiometrically the acid solubility of chrysotile asbestos may be expressed as follows $$Mg_6(OH)_8Si_4O_{10} + 12\,[H^+,Cl^-] + 16\,[H^+,F^-] \rightarrow 6[Mg^{++},2Cl^-] + 18\,H_2O + 4\,SiF_4$$

On a pound basis, one pound of asbestos can theoretically be dissolved using 0.78 pounds hydrochloric acid and 0.58 pounds hydrofluoric acid. In actual operations the strength of the acid solutions used would be adjusted for the safest and most efficient use at the site of the well being treated. In standard operations a ratio of weight percent hydrochloric acid to weight percent hydrofluoric acid in aqueous solution of 30:1 to 4:1 can be used with a range of 15:1 to 5:1 being preferred.

The following example is presented to show the disintegration of chrysotile asbestos fibers according to the process of this invention and is meant to be illustrative and not exclusive.

EXAMPLE I

One gram of asbestos fiber was added to 200 ml. of acid in a beaker for each test. The samples were aged at various temperatures with occasional stirring. At the end of the aging period the samples were filtered, washed with 200 ml. of water, dried in an oven, and the residue weighed. All weighing was done on a Mettler balance with an accuracy of ±0.01 gram. The aqueous solution of acids was prepared from hydrochloric acid, reagent grade 36 percent and hydrofluoric acid, technical grade 52 percent. In all tests 15 percent by weight hydrochloric acid in aqueous solution was used. The weight percent hydrofluoric acid is marked in the table showing the results. The asbestos fibers tested were Flosal, a chrysotile asbestos used as a drilling mud additive, trademarked to Drilling Specialties Company, and asbestos grades 3F, 3Z, 4H, 5D, 6D and 7D of the Johns Manville Company which are varying lengths of chrysotile asbestos fibers as specified by the Quebec (Canada) Standard Test issued by the Quebec Asbestos Mining Association.

TABLE I

EFFECTS OF HCl ON FLOSAL

| Asbestos Sample | Asbestos Sample |

| Time Hrs. | Final Weight g | Weight Loss % |
|---|---|---|
| 75°F (22°C) | | |
| 1 | .93 | 7 |
| 4 | .85 | 15 |
| 6 | .83 | 17 |
| 24 | .70 | 30 |
| 100°F (39°C) | | |
| .25 | .90 | 10 |
| .5 | .90 | 10 |
| .75 | .90 | 10 |
| 1 | .88 | 12 |
| 4 | .75 | 25 |
| 6 | .71 | 29 |
| 24 | .50 | 50 |
| 150°F (63°C) | | |
| .25 | .82 | 18 |
| .5 | .65 | 35 |
| .75 | .55 | 45 |
| 1 | .50 | 50 |
| 3 | .45 | 55 |
| 6 | .40 | 60 |
| 24 | .39 | 61 |
| 200°F (93°C) | | |
| .25 | .52 | 48 |
| .5 | .43 | 57 |
| .75 | .42 | 58 |
| 1 | .38 | 62 |
| 4 | .38 | 62 |
| 6 | .38 | 62 |
| 24 | .38 | 62 |

This table shows the effect of a 15 percent by weight aqueous hydrochloric acid solution on a one gram sample of the type chrysotile asbestos used in a drilling mud formulation. It should be noted that the percent solubility agrees closely with the figures quoted by Speil and Leineweber above.

TABLE II

EFFECT OF HCl AND HF ON FLOSAL

| Time | Asbestos Sample Final Weight | Asbestos Sample Weight loss | HF | HCl |
|---|---|---|---|---|
| Hrs. | g | % | weight % | weight % |
| 1 | .02 | 98 | 2.1 | 15 |
| 4 | .02 | 98 | 2.1 | 15 |
| 6 | .02 | 98 | 2.1 | 15 |
| 24 | .02 | 98 | 2.1 | 15 |
| 1 | .02 | 98 | 1.5 | 15 |
| 1 | .02 | 98 | 1.0 | 15 |
| 1 | .17 | 83 | 0.5 | 15 |
| 4 | .02 | 98 | 0.5 | 15 |
| 6 | .02 | 98 | 0.5 | 15 |

*All tests were run at 75°F (22°C)

This table, contrasted to the Table I above, shows the effectiveness of the aqueous solution of mixed acids of this invention in disintegrating asbestos fiber. As shown in this table, 98 percent of the asbestos is dissolved in a reasonable time by the acid mixture, whereas only approximately 60 percent of the asbestos could be dissolved by hydrochloric acid alone.

TABLE III

EFFECT OF HCl AND HC—HF ON ASBESTOS FIBER

| Time | Asbestos Sample Final Weight | Asbestos Sample Weight Loss | Asbestos Grade |
|---|---|---|---|
| Hrs. | g | % | |
| A. 15% HCl – 176°F (80°C) | | | |
| 18 | .47 | 53 | 3F |
| 18 | .48 | 52 | 3Z |
| 18 | .47 | 53 | 4H |
| 18 | .47 | 53 | 5D |
| 18 | .48 | 52 | 6D |
| 18 | .49 | 51 | 7D |
| B. 15% HCl·2.1% HF – 75°F (22°C) | | | |
| 1 | .02 | 98 | 3F |
| 1 | .02 | 98 | 5D |

This table contrasts the effectiveness of a mixture of hydrochloric acid and hydrofluoric acid in aqueous solution as an agent for dissolution of various asbestos fibers with the ability of hydrochloric acid alone to dissolve only about half of the fiber sample over a much longer period of time.

Reasonable variation and modification are possible within the scope of the foregoing disclosure and the appended claims to the invention, the essence of which is that hydrochloric acid and hydrofluoric acid in combination in aqueous solution can be used to disintegrate chrysotile asbestos fibers and thereby effectively remove from a well bore hole asbestos fibers that have been injected into the well in a drilling or producing operation.

I claim:

1. A method for disintegrating solid chrysotile asbestos comprising mixing the chrysotile asbestos at a temperature and for a time sufficient to react the chrysotile asbestos with an aqueous solution of a mixture of hydrochloric and hydrofluoric acid in proportions to supply at least the stoichiometric ideal reactive amount of hydrochloric acid and hydrofluoric acid per unit of chrysotile asbestos to be reacted.

2. A method for removing chrysotile asbestos from a well bore comprising injecting into the well an aqueous solution of a mixture of hydrochloric acid and hydrofluoric acid with circulation for a time sufficient to dissolve the chrysotile asbestos by the method of claim 1.

3. The method of claim 2 wherein the ratio of weight percent hydrochloric acid to weight percent hydrofluoric acid is in the range of 30:1 to 4:1.

4. The method of claim 1 wherein the combination of acids is comprised of 15 percent by weight hydrochloric acid and 2.1 percent by weight hydrofluoric acid.

* * * * *